(12) United States Patent
Hizaki

(10) Patent No.: US 12,002,307 B2
(45) Date of Patent: Jun. 4, 2024

(54) INFORMATION PROCESSING SYSTEM, COMMUNICATION TERMINAL, AND INFORMATION PROCESSING METHOD

(71) Applicant: TOYOTA JIDOSHA KABUSHIKI KAISHA, Toyota (JP)

(72) Inventor: Masaya Hizaki, Nagareyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 435 days.

(21) Appl. No.: 17/529,779

(22) Filed: Nov. 18, 2021

(65) Prior Publication Data

US 2022/0230486 A1 Jul. 21, 2022

(30) Foreign Application Priority Data

Jan. 21, 2021 (JP) ................. 2021-008104

(51) Int. Cl.
  *B60Q 1/00* (2006.01)
  *G05B 15/02* (2006.01)
  *G07C 5/08* (2006.01)
(52) U.S. Cl.
  CPC .......... *G07C 5/0816* (2013.01); *G05B 15/02* (2013.01); *G07C 5/0808* (2013.01)
(58) Field of Classification Search
  CPC ..... G07C 5/0816; G07C 5/0808; G05B 15/02
  USPC ...................................... 340/425.5
  See application file for complete search history.

(56) References Cited

U.S. PATENT DOCUMENTS

| | | | |
|---|---|---|---|
| 11,920,938 B2* | 3/2024 | Konrardy | G08G 1/165 |
| 2018/0050704 A1* | 2/2018 | Tascione | B60W 10/184 |
| 2019/0306180 A1* | 10/2019 | Dyakin | G06F 21/566 |
| 2020/0053112 A1* | 2/2020 | Torisaki | H04L 67/12 |
| 2021/0049051 A1* | 2/2021 | Ichimaru | G06F 3/0616 |
| 2022/0048468 A1* | 2/2022 | Bucheleres | B60R 25/102 |
| 2023/0245548 A1* | 8/2023 | Srnec | G08B 21/02 |
| | | | 340/573.1 |

FOREIGN PATENT DOCUMENTS

JP 2014-234100 A 12/2014

* cited by examiner

*Primary Examiner* — Naomi J Small
(74) *Attorney, Agent, or Firm* — Oliff PLC

(57) ABSTRACT

In an information processing system of the present disclosure, each of a plurality of ECUs registers information indicating presence or absence of an actual alarm for an item under control of the ECU, among a plurality of items in the first alarm list having a common format, and uniformly registers information indicating absence of an alarm for an item that is not under the control of the ECU. Each of the plurality of ECUs transmits the first alarm list in which registration is completed to a communication terminal. The communication terminal aggregates the number of alarms registered in a plurality of the first alarm lists received from the plurality of ECUs for each item, and aggregates the number of alarms registered in the plurality of the first alarm lists.

20 Claims, 11 Drawing Sheets

FIG. 6

SECOND ALARM LIST

| | | |
|---|---|---|
| THIRD ITEM | HIGHEST LEVEL OF ALARM | |
| FOURTH ITEMS | TOTAL NUMBER OF BATTERY-RELATED ALARMS | |
| | BATTERY-RELATED ALARM TYPE | |
| | TOTAL NUMBER OF MOTOR-RELATED ALARMS | |
| | MOTOR-RELATED ALARM TYPE | |
| | TOTAL NUMBER OF ENGINE-RELATED ALARMS | |
| | ENGINE-RELATED ALARM TYPE | |
| | TOTAL NUMBER OF OTHER ALARMS | |
| | OTHER ALARM TYPE | |
| FIFTH ITEMS | SPECIFIC ALARM 1 | |
| | SPECIFIC ALARM 2 | |
| | ⋮ | |

FIG. 7

FIRST ALARM LIST

| | |
|---|---|
| SECOND ITEMS { NUMBER OF ALARMS OF LEVEL 1 | |
| NUMBER OF ALARMS OF LEVEL 2 | |
| NUMBER OF ALARMS OF LEVEL 3 | |
| SPECIFIC ALARM 1 | |
| SPECIFIC ALARM 2 | |
| ⋮ | | } E1
| BATTERY-RELATED ALARM 1 | |
| BATTERY-RELATED ALARM 2 | |
| ⋮ | | } E2
| MOTOR-RELATED ALARM 1 | |
| MOTOR-RELATED ALARM 2 | |
| ⋮ | | } E3
| ENGINE-RELATED ALARM 1 | |
| ENGINE-RELATED ALARM 2 | |
| ⋮ | | } E4
| OTHER ALARM 1 | |
| OTHER ALARM 2 | |
| ⋮ | | } E5

FIRST ITEMS (SPECIFIC ALARM 1 through OTHER ALARM entries)

INFORMATION PROCESSING SYSTEM, COMMUNICATION TERMINAL, AND INFORMATION PROCESSING METHOD

CROSS-REFERENCE TO RELATED APPLICATION

This application claims priority to Japanese Patent Application No. 2021-008104 filed on Jan. 21, 2021, incorporated herein by reference in its entirety.

BACKGROUND

1. Technical Field

The present disclosure relates to an information processing system, a communication terminal, and an information processing method.

2. Description of Related Art

An in-vehicle communication device for transmitting abnormality information to an information center when an abnormality occurs in a device mounted on a vehicle is known (see, for example, Japanese Unexamined Patent Application Publication No. 2014-234100 (JP 2014-234100 A)).

SUMMARY

An object of the present disclosure is to provide a technology that can flexibly respond to changes in specifications of devices mounted on a vehicle.

The present disclosure can be regarded as an information processing system including a plurality of electronic control units (ECUs) mounted on a vehicle and a communication terminal mounted on the vehicle. In the information processing system in that case, for example: each of the plurality of ECUs may execute acquiring a first alarm list in a template state, the first alarm list having a format common to the plurality of ECUs and including a plurality of items for registering presence or absence of an alarm regarding devices mounted on the vehicle by type of alarm, registering information indicating presence or absence of an actual alarm, for an item under control of an ECU, among the plurality of items in the acquired first alarm list, uniformly registering information indicating absence of an alarm, for an item that is not under the control of the ECU, among the plurality of items in the acquired first alarm list, and transmitting the first alarm list in which registration of the information indicating the presence or absence of an alarm is completed, to the communication terminal; and the communication terminal may execute aggregating the number of alarms registered in a plurality of the first alarm lists received from the plurality of ECUs, for each of the items included in the first alarm list, and aggregating the number of alarms registered in the plurality of the first alarm lists for each of the devices.

The present disclosure can also be regarded as a communication terminal mounted on a vehicle having a plurality of ECUs. The communication terminal in that case may include a control unit that executes, for example, receiving a first alarm list from each of the plurality of ECUs, the first alarm list having a format common to the plurality of ECUs and including a plurality of items for registering presence or absence of an alarm regarding devices mounted on the vehicle by type of alarm, and the first alarm list being a list in which information indicating presence or absence of an actual alarm is registered for an item under control of each of the plurality of ECUs, among the plurality of items, and information indicating absence of an alarm is uniformly registered for an item that is not under the control of each of the plurality of ECUs, among the plurality of items, aggregating the number of alarms registered in a plurality of the first alarm lists received from the plurality of ECUs, for each of the items included in the first alarm list, and aggregating the number of alarms registered in the plurality of the first alarm lists for each of the devices.

The present disclosure can also be regarded as an information processing method that is executed by a communication terminal mounted on a vehicle including a plurality of ECUs. In the information processing method in that case, the communication terminal may execute, for example, a step of receiving a first alarm list from each of the plurality of ECUs, the first alarm list having a format common to the plurality of ECUs and including a plurality of items for registering presence or absence of an alarm regarding devices mounted on the vehicle by type of alarm, and the first alarm list being a list in which information indicating presence or absence of an actual alarm is registered for an item under control of each of the plurality of ECUs, among the plurality of items, and information indicating absence of an alarm is uniformly registered for an item that is not under the control of each of the plurality of ECUs, among the plurality of items, a step of aggregating the number of alarms registered in a plurality of the first alarm lists received from the plurality of ECUs, for each of the items included in the first alarm list, and a step of aggregating the number of alarms registered in the plurality of the first alarm lists for each of the devices.

The present disclosure can also be regarded as a program for causing a communication terminal mounted on a vehicle including a plurality of ECUs to execute the above-mentioned information processing method, or a non-transitory storage medium that stores the program.

According to the present disclosure, it is possible to provide a technology that can flexibly respond to changes in specifications of devices mounted on a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a diagram showing an example of a second alarm list;

FIG. 7 is a diagram showing an example of a first alarm list;

DETAILED DESCRIPTION OF EMBODIMENTS

Figure 1:
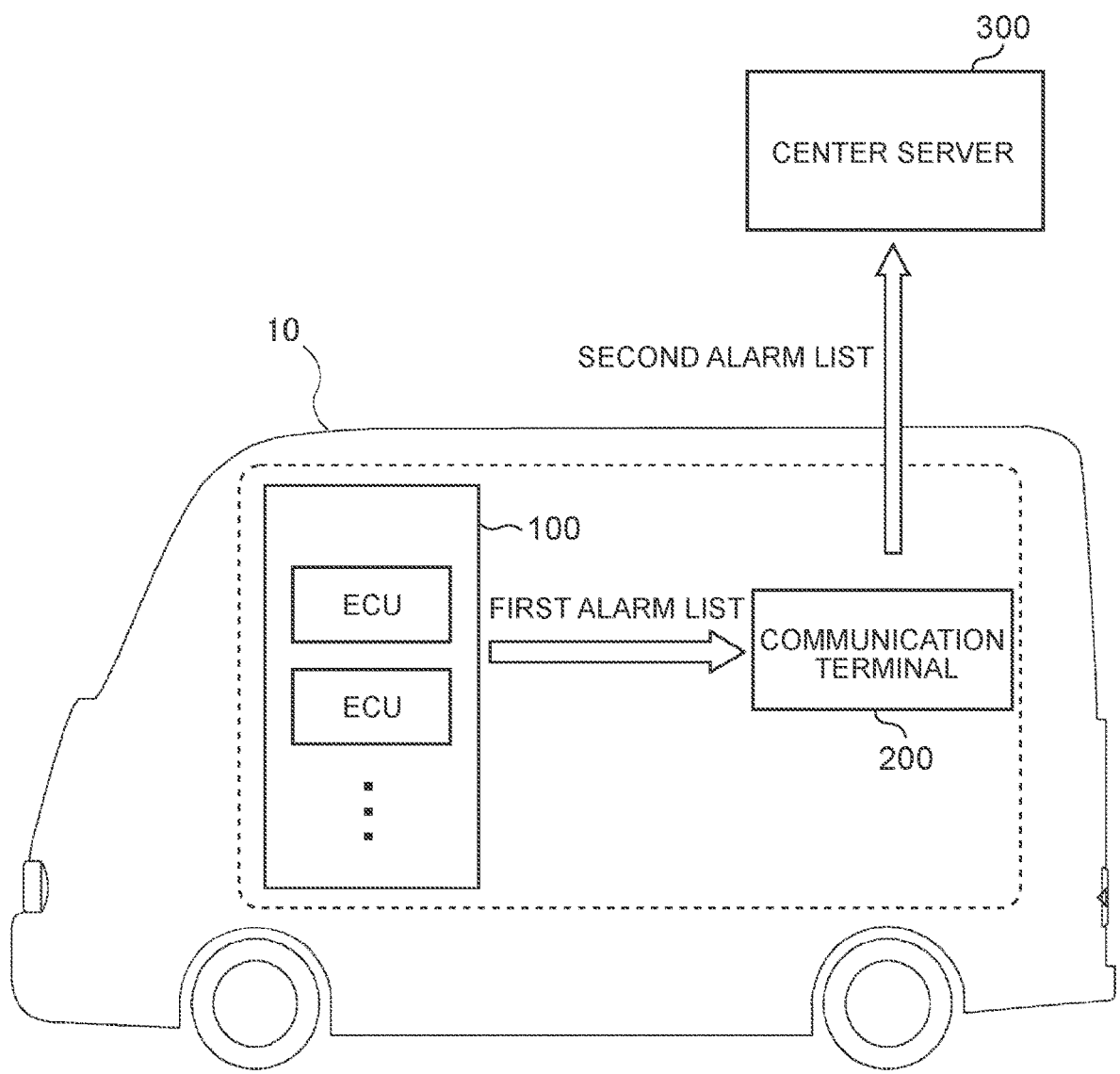
FIG. 1 is a diagram showing an outline of an in-vehicle system.

In recent years, with the progress of vehicle communication technology such as Vehicle-to-Everything (V2X), development of a vehicle equipped with a device (communication terminal) capable of communicating with an external device has been promoted. In such a vehicle, the communication terminal can collect, from the ECUs mounted on the vehicle, data indicating presence or absence of an alarm regarding devices such as a battery, a motor, or an internal combustion engine mounted on the vehicle (hereinafter, may be referred to as "in-vehicle devices"). This makes it possible to aggregate the number of alarms generated in the vehicle by type of alarm based on the collected data.

Here, in new energy vehicles such as electric vehicles (EVs) and plug-in hybrid vehicles (PHVs), data (alarm list) including the above aggregation results may be required to be transmitted periodically to a server (predetermined server) operated by a public institution and the like. At that time, the format of the alarm list transmitted from the in-vehicle device to the predetermined server (a plurality of items for registering the presence or absence of an alarm and the number of alarms by type of alarm) may be stipulated by laws and regulations. Thus, when the format of the alarm list is stipulated by laws and regulations, the communication terminal needs to aggregate the data collected from the ECUs for each item in accordance with the format of the alarm list.

When the format of the data provided from the ECUs to the communication terminal is different for each ECU, the aggregation process in the communication terminal is also different for each data provided from each ECU. Therefore, when the format of the data transmitted from an ECU to the communication terminal is changed due to changes in specifications of an in-vehicle device and the like, the aggregation process for the data from the ECU is also changed, so that the need for design change of the communication terminal arises. Thus, a technology is desired that can flexibly respond to changes in specifications of the in-vehicle devices such that a design change of the communication terminal does not arise even when the specifications of the in-vehicle devices change.

Thus, in an information processing system according to the present disclosure, each of a plurality of ECUs mounted on a vehicle is configured to use an alarm list having a format common to the plurality of ECUs (first alarm list) to notify a communication terminal of presence or absence of an alarm regarding an in-vehicle device under control of each ECU. The first alarm list in the present disclosure includes a plurality of items for registering presence or absence of an alarm by type of alarm that can be generated in a plurality of in-vehicle devices. Each ECU acquires the first alarm list in a template state, and registers information indicating presence or absence of an actual alarm for an item under control of the ECU, among the plurality of items in the acquired first alarm list. Each ECU uniformly registers information indicating absence of an alarm for an item that is not under the control of the ECU, among the plurality of items in the acquired first alarm list. Each ECU transmits the first alarm list in which registration of the information indicating presence or absence of an alarm is completed, to the communication terminal.

When the communication terminal receives the first alarm list from each of the plurality of ECUs, the communication terminal aggregates the number of alarms registered in the plurality of first alarm lists for each item included in the first alarm list. For example, the communication terminal calculates a total number of alarms for each item, by performing logical sum operation for each item, for the number of alarms registered in a plurality of the first alarm lists. Further, the communication terminal aggregates the number of alarms registered in the plurality of the first alarm lists for each in-vehicle device.

With the information processing system according to the present disclosure, even when the specifications of an in-vehicle device and the like are changed, the format of data transmitted from the ECU that manages the in-vehicle device conforms to the first alarm list. Therefore, when the specifications of the in-vehicle device and the like are changed, it is not necessary to change the aggregation process performed by the communication terminal. As a result, it is not necessary to change the design of the communication terminal when the specifications of the in-vehicle device and the like are changed. Thus, it is possible to provide an information processing system that can flexibly respond to changes in specifications of in-vehicle devices. Further, in the information processing system according to the present disclosure, the first alarm list has a format common to a plurality of ECUs, so it is possible to simplify the aggregation process performed by the communication terminal.

Here, the communication terminal may generate a second alarm list including an item in which the aggregation result of the number of alarms for each item is registered and an item in which the aggregation result of the number of alarms for each in-vehicle device is registered and transmit the generated second alarm list to a predetermined server. The "predetermined server" here is, for example, a server operated by a public institution and the like that require provision of alarm lists. Thus, it is possible to provide information regarding alarms generated in vehicles to a public institution and the like.

The plurality of items in the first alarm list may include a plurality of first items for registering presence or absence of an alarm regarding in-vehicle devices by type of alarm and a plurality of second items for registering the total number of alarms generated under control of each of the plurality of ECUs for each of levels corresponding to severity of alarm. This assumes a case in which the number of alarms regarding the in-vehicle devices and a level of alarm having the highest severity among the alarms generated in the vehicle are required to be provided to a public institution and the like. That is, this assumes the case in which the format of the second alarm list is defined to include the following items (1) to (3):

(1) an item for registering information indicating a level of an alarm having the highest severity among the alarms generated in the vehicle (third item);

(2) an item for registering an aggregation result of the number of alarms for each in-vehicle device (fourth item); and (3) an item for registering presence or absence of an alarm of a specific type regarding the in-vehicle devices (fifth item).

The "in-vehicle device" here is, for example, an in-vehicle device specific to a new energy vehicle, and is a rechargeable battery, a motor that uses electric power of the battery to cause the vehicle to travel, and the like.

When the format of the first alarm list is defined based on the format of the second alarm list as described above, the communication terminal identifies the alarm having the highest severity among the alarms generated in the vehicle based on the information registered in the second item in the plurality of the first alarm lists received from the plurality of ECUs. Thereby, the communication terminal can register the information indicating the level of the identified alarm in the third item in the second alarm list. Further, the communication terminal aggregates the number of alarms registered in the first items in the plurality of the first alarm lists for each in-vehicle device. As a result, the communication terminal can register the aggregation result in the fourth item in the second alarm list. In addition, the communication terminal aggregates the number of alarms regarding an alarm of a specific type, among the number of alarms registered in the first items in the plurality of the first alarm lists. At that time, the plurality of first items in the first alarm list may include an item for registering an alarm of the same type as that in the fifth item in the second alarm list. With this, the communication terminal aggregates the number of alarms registered in the item corresponding to the fifth item among the plurality of first items in the plurality of the first alarm lists, so as to be able to derive information to be registered in the fifth item of the second alarm list. Thus, the format of the first alarm lists is set based on the format of the second alarm list, so that it is possible to simplify the process for generating the second alarm list.

A situation is conceivable in which an abnormality occurs in a specific ECU, among the plurality of ECUs. In such a situation, there is a possibility that the first alarm list is not transmitted from the specific ECU to the communication terminal. On the other hand, a situation is also conceivable in which an alarm is not generated in the in-vehicle device under the control of the specific ECU. In such a situation, the first alarm list in which the information indicating the absence of an alarm is registered in the item under the control of the specific ECU is transmitted from the specific ECU to the communication terminal. In the information processing system according to the present disclosure, each of the plurality of ECUs registers information indicating the absence of an alarm for an item that is not under the control of the ECU. Thus, in the aggregation results of the number of alarms for each item, there is a possibility that the communication terminal cannot determine whether an abnormality has occurred in the specific ECU (the first alarm list is not normally transmitted from the specific ECU to the communication terminal) or an alarm is not generated in the in-vehicle device under the control of the specific ECU, when the number of alarms for all the items under the control of the specific ECU is zero.

In the information processing system according to the present disclosure, the plurality of ECUs may repeatedly transmit the first alarm list to the communication terminal at a predetermined cycle. Along with this, when the first alarm list from the specific ECU, among the plurality of ECUs, cannot be received a predetermined number of times consecutively, the communication terminal may determine that an abnormality has occurred in the specific ECU. Thereby, when the number of alarms for all the items under the control of the specific ECU is zero, the communication terminal can determine whether an abnormality has occurred in the specific ECU or an alarm is not generated in the in-vehicle device under the control of the specific ECU. The "predetermined cycle" here may be the same cycle as the cycle of transmitting the second alarm list from the communication terminal to the predetermined server.

Embodiments

Hereinafter, an embodiment of the present disclosure will be described with reference to the drawings. The configuration of the following embodiment is illustrative, and the present disclosure is not limited to the configuration of the embodiment.

Overall Configuration of System

FIG. 1 is a diagram showing a schematic configuration of an in-vehicle system to which the present disclosure is applied. The in-vehicle system in the present embodiment includes a plurality of ECUs 100 mounted on a vehicle 10 and a communication terminal 200 mounted on the vehicle 10.

The vehicle 10 in this example is a PHV including a battery that can be charged by an external power source, a motor driven by the battery, and an internal combustion engine that cooperates with the motor to cause the vehicle 10 to travel (hereinafter, may be referred to as "engine"). The vehicle 10 is not limited to the PHV, and may be a new energy vehicle (for example, an EV, a fuel cell vehicle (FCV), and the like).

Figure 2:
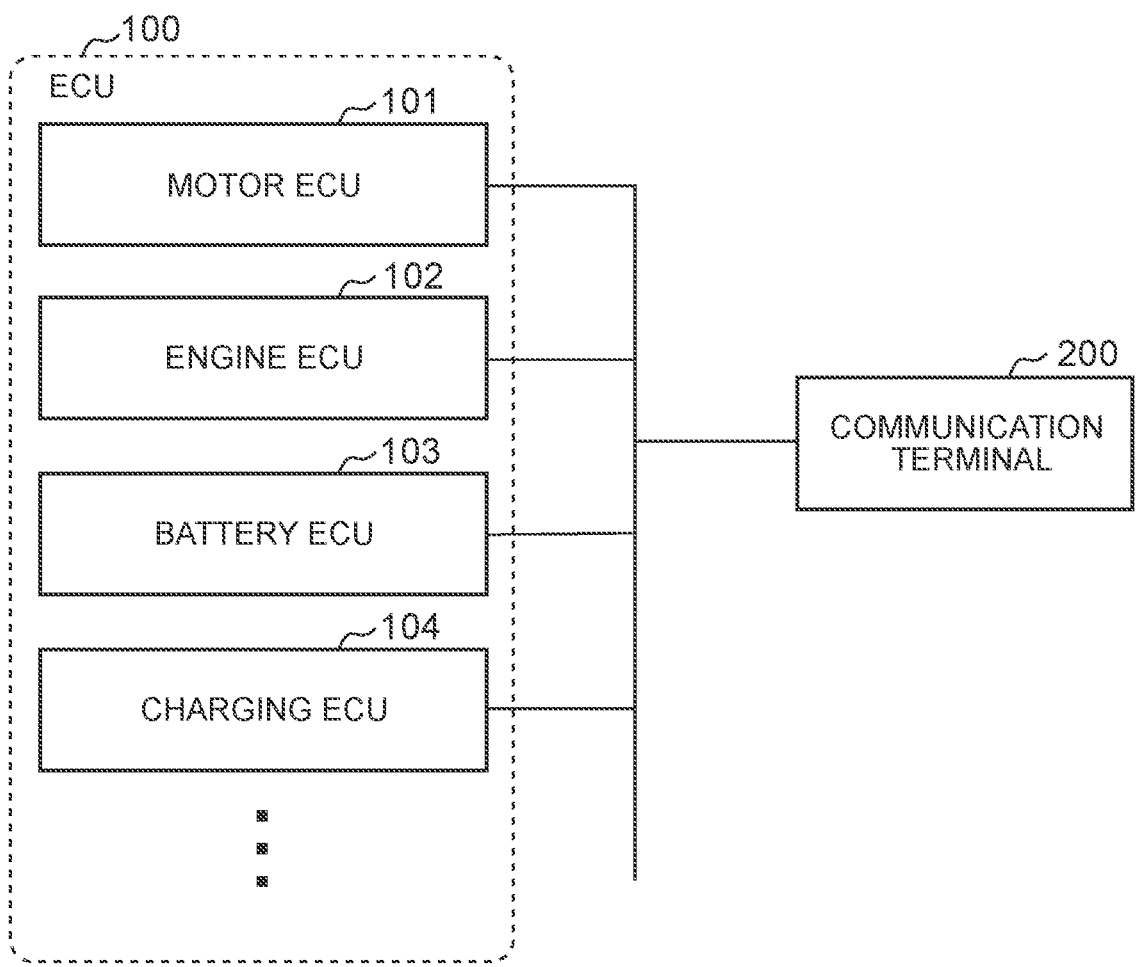
FIG. 2 is a diagram showing examples of electronic control units (ECUs) mounted on a vehicle.

The ECUs 100 are electronic control units for controlling in-vehicle devices such as the above-mentioned battery, motor, and engine. As shown in FIG. 2, the ECUs 100 in this example includes an ECU (motor ECU) 101 for controlling the motor, an ECU (engine ECU) 102 for controlling the engine, an ECU (battery ECU) 103 for managing the state of the battery, an ECU (charging ECU) 104 for controlling charging of the battery, and the like. Each of the ECUs 100 has a function of transmitting a first alarm list to the communication terminal 200 at a predetermined cycle. The first alarm list is an alarm list having a format common to the ECUs 100, and has a plurality of items for registering presence or absence of an alarm regarding the above in-vehicle devices by type of alarm. Details of the first alarm list will be described later. Each of the ECUs 100 also has a function of registering information indicating presence or absence of an actual alarm for an item under its control, among the items in the first alarm list. Each of the ECUs 100 also has a function of uniformly registering information indicating absence of an alarm, for items that are not under its control, among the items in the first alarm list. The first alarm list in which the registration of the information indicating the presence or absence of an alarm is completed is transmitted from the ECU 100 to the communication terminal 200.

The communication terminal 200 is connected to the ECUs 100 by a controller area network (CAN) standard bus (CAN-BUS), and has a function of generating a second alarm list based on the plurality of first alarm lists received from the ECUs 100. The second alarm list is an alarm list that is transmitted to a center server 300 at a predetermined cycle, and includes a plurality of items for registering presence or absence of an alarm of a type stipulated by laws and regulations. Details of the second alarm list will be described later. The center server 300 in this example is a server operated by a public institution. The "public institution" here is, for example, an institution that requires new energy vehicles to provide the second alarm list on a regular basis. The communication terminal 200 also has a function of transmitting the second alarm list to the center server 300 using wireless communication.

In the in-vehicle system configured as described above, each of the ECUs 100 generates the first alarm list at a predetermined cycle, and transmits the generated first alarm list to the communication terminal 200. The communication terminal 200 generates the second alarm list based on the information registered in the first alarm lists received from the ECUs 100, and transmits the generated second alarm list to the center server. In this example, the data regarding the alarm is transmitted and received using the first alarm lists having a format defined in advance. Therefore, when the specifications of the ECUs 100 are changed in conjunction with changes in specifications of the in-vehicle devices and the like, it is possible to suppress the format of the data transmitted from the ECUs 100 to the communication terminal 200 from being changed. Also in this example, the format of the first alarm lists is determined so as to correspond to the format of the second alarm list. Therefore, it is also possible to simplify the process for generating the second alarm list in the communication terminal 200.

Hardware Configuration of In-Vehicle System

Figure 3:
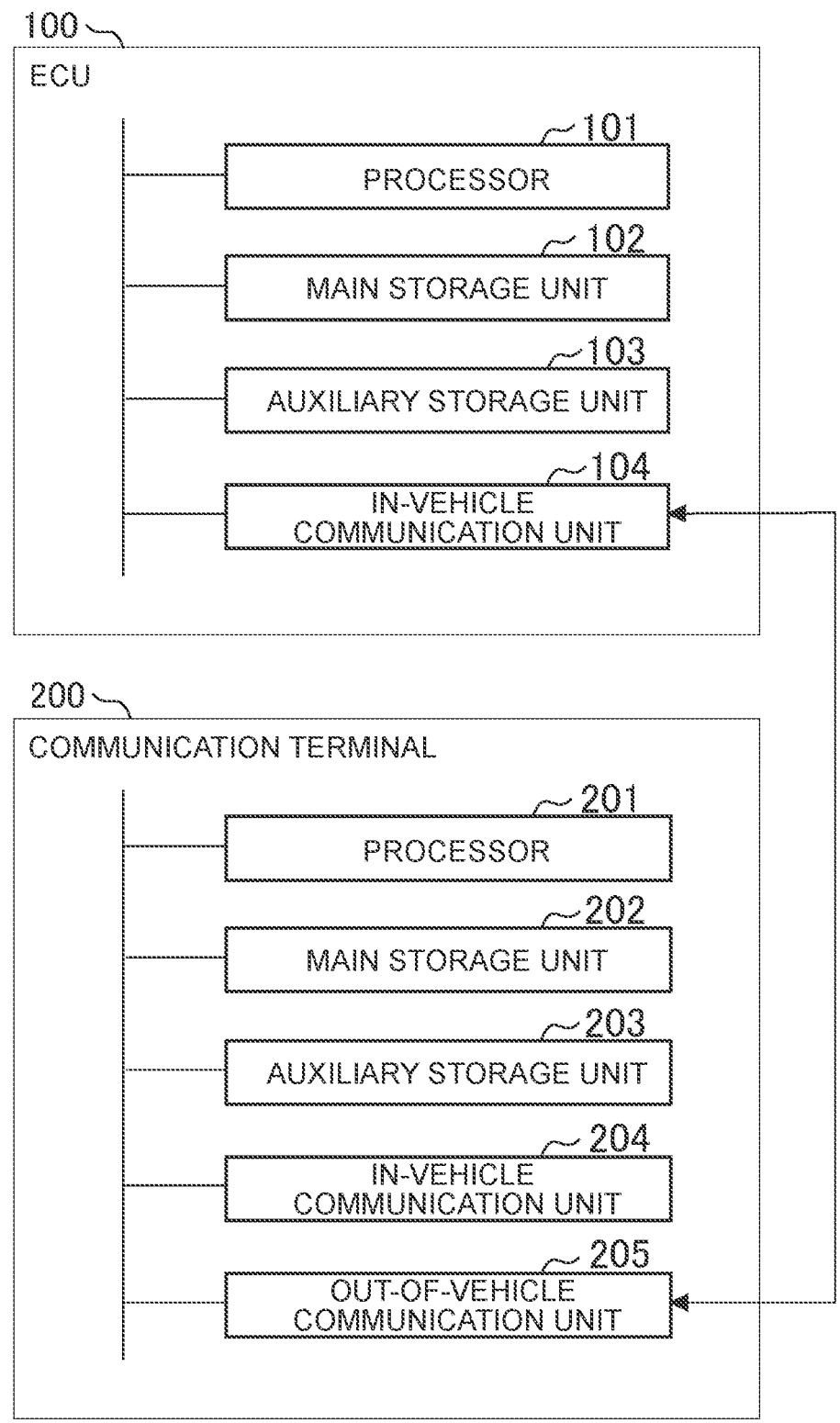
FIG. 3 is a diagram showing an example of a hardware configuration of components included in the in-vehicle system.

FIG. 3 is a diagram showing an example of a hardware configuration of the ECU 100 and the communication terminal 200 included in the in-vehicle system. Although only one of the ECUs 100 is shown in FIG. 3, the hardware configurations of the other ECUs 100 are the same.

The ECU 100 is an electronic control unit for controlling an in-vehicle device, and performs various processes for transmitting the first alarm list to the communication terminal 200 at a predetermined cycle. As shown in FIG. 3, the ECU 100 includes a processor 101, a main storage unit 102, an auxiliary storage unit 103, and an in-vehicle communication unit 104. The ECU 100 implements a function that meets a predetermined purpose, as the processor 101 loads a program stored in the auxiliary storage unit 103 into a work area of the main storage unit 102 and executes the program.

The processor 101 is, for example, a central processing unit (CPU) or a digital signal processor (DSP). The processor 101 controls the ECU 100 and performs various information processing calculations.

The main storage unit 102 includes, for example, a random access memory (RAM), a read-only memory (ROM), and the like. As described above, in the main storage unit 102, the work area for the processor to execute the program is set.

The auxiliary storage unit 103 includes, for example, an erasable programmable ROM (EPROM), a hard disk drive (HDD), and the like. The auxiliary storage unit 103 stores various programs, various kinds of data, and various tables in a recording medium such that they are readable and writable. The programs stored in the auxiliary storage unit 103 include, in addition to an operating system (OS) and the like, a program for implementing a process for transmitting the first alarm list to the communication terminal 200 at a predetermined cycle. Further, the data stored in the auxiliary storage unit 103 may include the first alarm list in a template state (first alarm list in a state in which information indicating the presence or absence of an alarm is not registered). Part or all of the information stored in the auxiliary storage unit 103 may be stored in the main storage unit 102. Further, part of the information stored in the main storage unit 102 may be stored in the auxiliary storage unit 103.

The communication unit 104 is an interface for connecting the ECU 100 to the in-vehicle network (CAN-BUS). The in-vehicle communication unit 104 connects to the in-vehicle network using, for example, a CAN standard interface circuit. In the present embodiment, the in-vehicle communication unit 104 communicates with the other ECUs 100 and the communication terminal 200 through the in-vehicle network.

The series of processes executed by the ECU 100 can be executed by hardware or software.

Next, the communication terminal 200 is a communication terminal mounted on the vehicle 10, and performs various processes for transmitting the second alarm list to the center server 300 at a predetermined cycle. As shown in FIG. 3, the communication terminal 200 includes a processor 201, a main storage unit 202, an auxiliary storage unit 203, an in-vehicle communication unit 204, and an out-of-vehicle communication unit 205. The communication terminal 200 implements a function that meets a predetermined purpose, as the processor 201 loads a program stored in the auxiliary storage unit 203 into a work area of the main storage unit 202 and executes the program.

Since the processor 201, the main storage unit 202, and the in-vehicle communication unit 204 are the same as the processor 101, the main storage unit 102, and the in-vehicle communication unit 104 of the ECU 100, the description thereof will be omitted.

The auxiliary storage unit 203 may include a removable medium in addition to the same configuration as that of the auxiliary storage unit 103 of the ECU 100. The removable medium is, for example, a universal serial bus (USB) memory or a disc recording medium such as a compact disc (CD) or a digital versatile disc (DVD). Further, the program stored in the auxiliary storage unit 203 includes a program for implementing a process for transmitting the second alarm list to the center server 300.

The out-of-vehicle communication unit 205 is an interface for connecting the communication terminal 200 to the network. The out-of-vehicle communication unit 205 connects to the network by a mobile communication method such as long term evolution (LTE), LTE-advanced, and 5th generation (5G), or a wireless communication method such as Wi-Fi. In the present embodiment, the out-of-vehicle communication unit 205 communicates with the center server 300 through the network.

The series of processes executed by the communication terminal 200 configured as described above can be executed by hardware or software.

Functional Configuration of ECU

Figure 4:
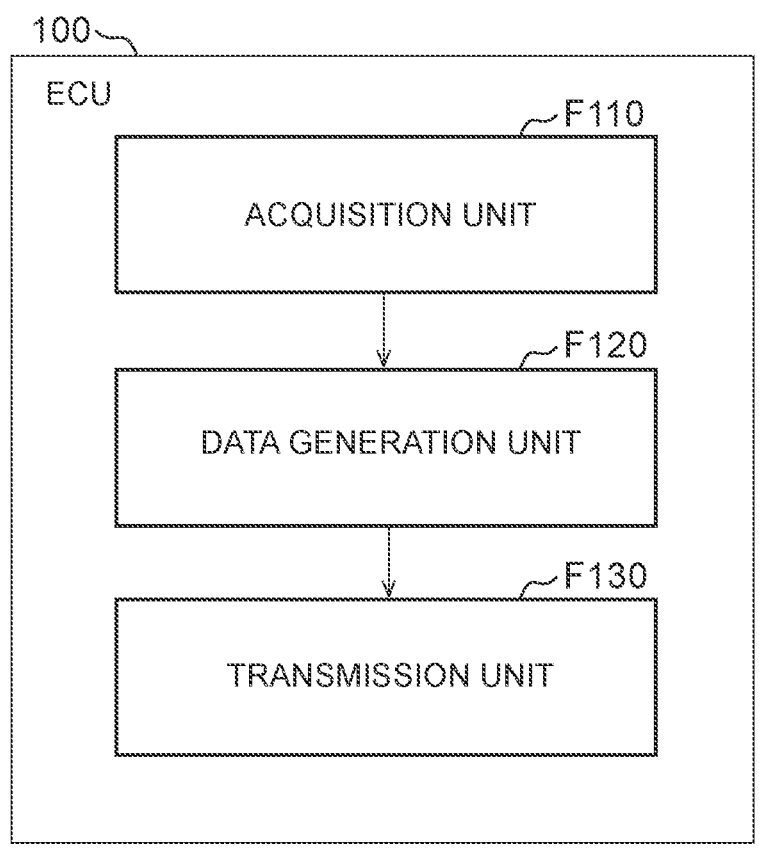
FIG. 4 is a block diagram showing an example of a functional configuration of the ECU according to an embodiment.

Here, an example of the functional configuration of the ECU 100 in the present embodiment will be described with reference to FIG. 4. As shown in FIG. 4, the ECU 100 in the present embodiment includes an acquisition unit F110, a data generation unit F120, and a transmission unit F130 as its functional components. The acquisition unit F110, the data generation unit F120, and the transmission unit F130 are implemented, as the processor 101 executes a program loaded on the main storage unit 102. Any of the acquisition unit F110, the data generation unit F120, and the transmission unit F130, or a part thereof may be implemented by a hardware circuit. Further, the functional configuration of the ECU 100 is not limited to the example shown in FIG. 4, and components may be omitted, replaced, or added as appropriate.

The acquisition unit F110 acquires the first alarm list in a template state at a predetermined cycle. Here, when the first alarm list in the template state is stored in the auxiliary storage unit 103 of the ECU 100, the acquisition unit F110 reads out the first alarm list in the template state from the auxiliary storage unit 103. The first alarm list in the template state may be provided from the communication terminal 200 to the ECU 100 at a predetermined cycle. The first alarm list acquired by the acquisition unit F110 is passed from the acquisition unit F110 to the data generation unit F120.

The data generation unit F120 registers information indicating presence or absence of an alarm in each item of the first alarm list passed from the acquisition unit F110, so as to complete the first alarm list. The first alarm list has a format common to the ECUs 100 mounted on the vehicle 10, and has a plurality of items for registering presence or absence of an alarm regarding the in-vehicle devices by type of alarm, as described above. The data generation unit F120 registers information indicating presence or absence of an actual alarm for an item under the control of the ECU 100, among a plurality of first items in the first alarm list, which will be described later. For example, when the ECU 100 is the motor ECU 101, the data generation unit F120 registers the information indicating presence or absence of an actual alarm related to the motor for an item related to the motor, among the first items in the first alarm list. The data generation unit F120 uniformly registers information indicating absence of an alarm for items that are not under the control of the ECU 100, among the first items in the first alarm list. For example, when the ECU 100 is the motor ECU 101, the data generation unit F120 uniformly registers the information indicating absence of an alarm for the items other than the item related to the motor, among the first items in the first alarm list. Further, the data generation unit F120 registers the number of alarms for each level for a second item in the first alarm list, which will be described later. When the data generation unit F120 finishes registering information for all the items of the first alarm list, the data generation unit F120 passes, to the transmission unit F130, the first alarm list in which registration of the information is completed. Regarding whether an alarm of a type corresponding to the item under the control of the ECU 100 is generated, the data generation unit F120 may determine based on detection values of various sensors and the like attached to the in-vehicle devices at the timing of generating the first alarm list.

The transmission unit F130 transmits the first alarm list generated by the data generation unit F120 to the communication terminal 200 through the in-vehicle communication unit 104.

Functional Configuration of Communication Terminal

Figure 5:
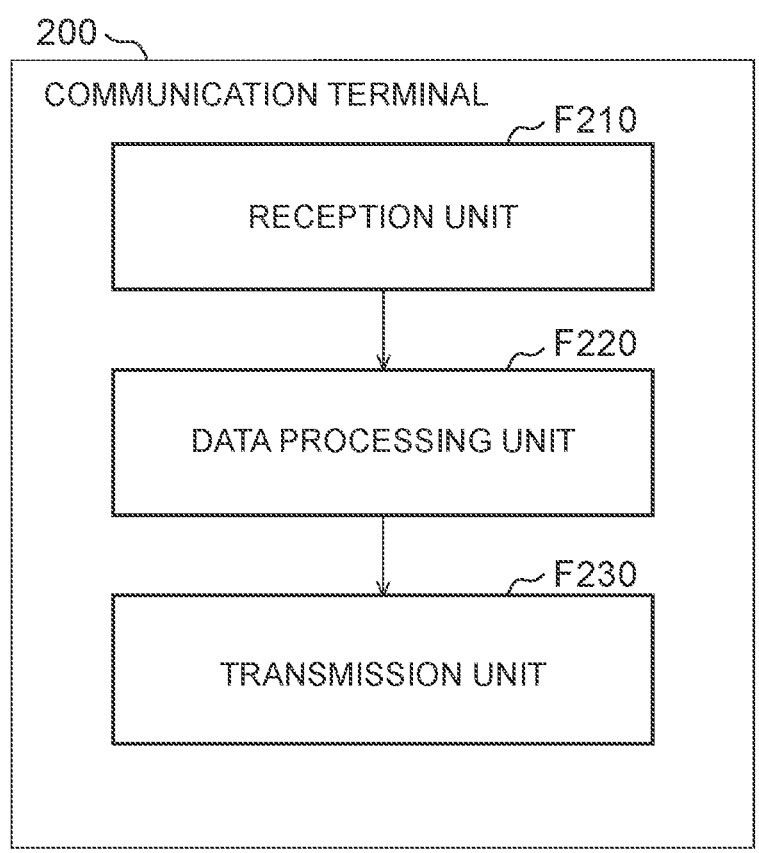
FIG. 5 is a block diagram showing an example of a functional configuration of the communication terminal according to the embodiment.

Next, an example of the functional configuration of the communication terminal 200 in the present embodiment will be described with reference to FIG. 5. As shown in FIG. 5, the communication terminal 200 in the present embodiment includes a reception unit F210, a data processing unit F220, and a transmission unit F230 as its functional components. The reception unit F210, the data processing unit F220, and the transmission unit F230 are implemented, as the processor 201 executes a program loaded on the main storage unit 202. The combination of the reception unit F210, the data processing unit F220, and the transmission unit F230 corresponds to the "control unit" of the communication terminal according to the present disclosure. Any or part of the reception unit F210, the data processing unit F220, and the transmission unit F230 may be implemented by a hardware circuit. Further, the functional configuration of the communication terminal 200 is not limited to the example shown in FIG. 5, and components may be omitted, replaced, or added as appropriate.

The reception unit F210 receives the first alarm list transmitted from each of the ECUs 100 at a predetermined cycle through the in-vehicle communication unit 204. The first alarm lists received by the reception unit F210 are passed from the reception unit F210 to the data processing unit F220.

The data processing unit F220 generates the second alarm list based on the first alarm lists received by the reception unit F210. The second alarm list is an alarm list required to be transmitted to the center server 300 at a predetermined cycle, and includes a plurality of items for registering presence or absence of an alarm of a type stipulated by laws and regulations, as described above.

Here, an example of the second alarm list is shown in FIG. 6. In the example shown in FIG. 6, the second alarm list includes a third item, fourth items, and fifth items. The format of the second alarm list including the third item, the fourth items, and the fifth items (types of items and order of items) is defined based on the laws and regulations of the country or region and the like. However, the types of items included in the second alarm list and the order of the items are not limited to the example shown in FIG. 6, and can be appropriately changed based on the laws and regulations of the country or region and the like where the vehicle 10 is used.

The third item is an item for registering information indicating an alarm of the highest level among the alarms generated in the vehicle 10. The "level" here is an index regarding the severity of alarm. Such a level is set in advance for each type of alarm. Here, when three levels from level 1 to level 3 are set and the alarm of level 3 having the highest severity is generated in the vehicle 10, the information indicating level 3 is registered in the third item. When the alarm of level 3 is not generated in the vehicle 10 and an alarm of level 2 having the second highest severity is generated in the vehicle 10, the information indicating level 2 is registered in the third item. When the alarms of level 2 and level 3 are not generated in the vehicle 10 and an alarm of level 1 having the lowest severity is generated in the vehicle 10, the information indicating level 1 is registered in the third item. When no alarm of any level from level 1 to level 3 is generated in the vehicle 10, "0" is registered in the third item.

The fourth items include a plurality of items classified for each in-vehicle device. The "in-vehicle device" here is a device that can be mounted on a new energy vehicle, and is classified into, for example, a battery, a motor, an engine, and others. Among the fourth items, the items classified into the battery include an item for registering the total number of alarms generated in the battery and an item for registering information indicating the types of alarms generated in the battery. Among the fourth items, the items classified into the motor include an item for registering the total number of alarms generated in the motor and an item for registering information indicating the types of alarms generated in the motor. Among the fourth items, the items classified into the engine include an item for registering the total number of alarms generated in the engine and an item for registering information indicating the types of alarms generated in the engine. Among the fourth item, the items classified into the others include an item for registering the total number of alarms generated in the in-vehicle devices other than the battery, the motor, and the engine (hereinafter, may be referred to as "other in-vehicle devices") and an item for registering information indicating the types of alarms generated in the other in-vehicle devices.

The fifth items include a plurality of items for registering presence or absence of alarms of specific types. The alarms of specific types are some of the alarms for in-vehicle devices that are specific to new energy vehicles. The alarms of specific types include, for example, an alarm regarding a battery temperature, an alarm regarding a battery state of charge (SOC), an alarm regarding a battery voltage, an alarm regarding a motor temperature, and the like.

Next, an example of the first alarm list is shown in FIG. 7. The first alarm list is an alarm list generated in a format common to the ECUs 100 mounted on the vehicle 10, and has a plurality of items for registering presence or absence of an alarm regarding the in-vehicle devices by type of alarm, as described above. Specifically, the first alarm list in the present embodiment includes the first items and the second items as shown in FIG. 7. Each of the first items and the second items illustrated in FIG. 7 is determined based on the format of the second alarm list shown in FIG. 6. Therefore, when the format of the second alarm list is changed to a format different from the example shown in FIG. 6, the items included in the first alarm list can be changed, deleted, or added accordingly.

As shown in FIG. 7, the first items include a plurality of items for registering presence or absence of alarms regarding the in-vehicle devices by type of alarm. The in-vehicle devices are devices that can be mounted on a new energy vehicle as described above, and include a battery, a motor, an engine, and other in-vehicle devices. The items regarding each of the battery, the motor, the engine, and the other in-vehicle devices (E2 to E5 in FIG. 7) include a plurality of items for each type of alarm stipulated by laws and regulations. Further, at least one (E1 in FIG. 7) of the first items is set such that the presence or absence of alarms of the same type as in the fifth items in the second alarm list. That is, the first items include items for registering the presence or absence of alarms of specific types among the alarms regarding the in-vehicle devices. In each item included in the first items, for example, "1" is registered when there is an alarm, and "0" is registered when there is no alarm.

The second items include a plurality of items for registering the number of alarms for each level. The "level" here is an index regarding the severity of alarm, and is set in advance for each type of alarm (each item included in the first items), as described above. In the example shown in FIG. 7, the second items include an item for registering "the number of alarms of level 1", an item for registering "the number of alarms of level 2", and an item for registering "the number of alarms of level 3". The "number of alarms of level 1" is the number of alarms of a type corresponding to level 1 (the number of alarms in the item for registering the presence or absence of an alarm of the type corresponding to level 1, among the items included in the first items). The "number of alarms of level 2" is the number of alarms of a type corresponding to level 2 (the number of alarms in the item for registering the presence or absence of an alarm of the type corresponding to level 2, among the items included in the first items). The "number of alarms of level 3" is the number of alarms of a type corresponding to level 3 (the number of alarms in the item for registering the presence or absence of an alarm of the type corresponding to level 3, among the items included in the first items).

When the reception unit F210 receives the first alarm lists having the format shown in FIG. 7 from the ECUs 100, the data processing unit F220 aggregates the total number of alarms registered in the first alarm lists for each item. Specifically, the data processing unit F220 performs logical sum calculation of the numerical values ("0" or "1") registered in each item of the first alarm lists, for each item. At that time, when there is only one first alarm list in which "1" is registered in the item of the "number of alarms of level 1" in FIG. 7, among the first alarm lists, the total number of alarms of level 1 is calculated as "1". When there is no first alarm list in which "1" is registered in the item of the "number of alarms of level 1", among the first alarm lists, the total number of alarms of level 1 is calculated as "0". The data processing unit F220 also performs the aggregation for the items of the "number of alarms of level 2" and the "number of alarms of level 3" in the same manner, and derives the total number of alarms for each of levels 1 to 3. At that time, when the total number of alarms of level 3 is "1" or more, the data processing unit F220 registers information indicating level 3 (for example, "3") for the item of the "alarm of the highest level" in the second alarm list shown in FIG. 6. When the total number of alarms of level 3 is "0" and the total number of alarms of level 2 is "1" or more, the data processing unit F220 registers information indicating level 2 (for example, "2") for the item of the "alarm of the highest level" in the second alarm list shown in FIG. 6. When the total number of alarms of level 3 and the total number of alarms of level 2 are "0" and the total number of alarms of level 1 is "1" or more, the data processing unit F220 registers information indicating level 1 (for example, "1") for the item of the "alarm of the highest level" in the second alarm list shown in FIG. 6. When the total number of alarms of levels 1 to 3 is "0", the data processing unit F220 registers "0" for the item of the "alarm of the highest level" in the second alarm list shown in FIG. 6.

The data processing unit F220 registers the aggregation result of the items for registering the presence or absence of the alarms of specific types (items included in E1 in FIG. 7), among the aggregation results for each item included in the first items, in the items corresponding to the fifth items in the second alarm list. For example, when the aggregation result of the item of the "specific alarm 1" (the total number of alarms in the item of the "specific alarm 1") is "1", the data processing unit F220 registers "1" for the item of the "specific alarm 1" among the fifth items of the second alarm list shown in FIG. 6. The data processing unit F220 also registers the aggregation results of the items of the "specific alarm 2" and subsequent items, in the items of the "specific alarm 2" and the subsequent items among the fifth items in the second alarm list shown in FIG. 6.

Further, the data processing unit F220 aggregates the total numbers of alarms registered in the first alarm lists for each in-vehicle device. That is, the data processing unit F220 aggregates, for each in-vehicle device, the aggregation results for each item, regarding the items for registering the presence or absence of alarms other than the alarms of specific types (E2 to E5 in FIG. 7), among the first items in the first alarm list. For example, for the battery, the data processing unit F220 totals the aggregation results for each item regarding the battery (aggregation results of the items included in E2 in FIG. 7) to calculate the total number of alarms generated in the battery. For the motor, the data processing unit F220 totals the aggregation results for each item regarding the motor (aggregation results of the items included in E3 in FIG. 7) to calculate the total number of alarms generated in the motor. For the engine, the data processing unit F220 totals the aggregation results for each item regarding the engine (aggregation results of the items included in E4 in FIG. 7) to calculate the total number of alarms generated in the engine. For the other in-vehicle devices, the data processing unit F220 totals the aggregation results for each item regarding the other in-vehicle devices (aggregation results of the items included in E5 in FIG. 7) to calculate the total number of alarms generated in the other in-vehicle devices. The aggregation results for each in-vehicle device thus obtained are registered in the corresponding items among the fourth items in the second alarm list. For example, the total number of alarms generated in the battery is registered in the item of the "total number of battery-related alarms" among the fourth items in the second alarm list shown in FIG. 6. The total number of alarms generated in the motor is registered in the item of the "total number of motor-related alarms" among the fourth items in the second alarm list shown in FIG. 6. The total number of alarms generated in the engine is registered in the item of the "total number of engine-related alarms" among the fourth items in the second alarm list shown in FIG. 6. The total number of alarms generated in the other in-vehicle devices is registered in the item of the "total number of other alarms" among the fourth items in the second alarm list shown in FIG. 6.

Among the fourth items in the second alarm list shown in FIG. 6, for the items of the "battery-related alarm type", the "motor-related alarm type", the "engine-related alarm type", and the "other alarm type", information for identifying the item in which information indicating the presence of an alarm ("1") is registered, among the first items in the first alarm list, is registered. For example, in the item of the "battery-related alarm type" in the second alarm list shown in FIG. 6, information for identifying the item in which the information indicating the presence of an alarm ("1") is registered, among the items included in E2 in FIG. 7, is registered. When there is a plurality of items in which the information indicating the presence of an alarm ("1") is registered, among the items included in E2 in FIG. 7, the information for identifying each of the items is registered in the item of the "battery-related alarm type" in the second alarm list shown in FIG. 6. In the item of the "motor-related alarm type" in the second alarm list shown in FIG. 6, information for identifying the item in which the information indicating the presence of an alarm ("1") is registered, among the items included in E3 in FIG. 7, is registered. In the item of the "engine-related alarm type" in the second alarm list shown in FIG. 6, information for identifying the item in which the information indicating the presence of an alarm ("1") is registered, among the items included in E4 in FIG. 7, is registered. In the item of the "other alarm type" in the second alarm list shown in FIG. 6, information for identifying the item in which the information indicating the presence of an alarm ("1") is registered, among the items included in E5 in FIG. 7, is registered.

When the second alarm list is generated by the above procedure, the generated second alarm list is passed from the data processing unit F220 to the transmission unit F230.

The transmission unit F230 transmits the second alarm list generated by the data processing unit F220 to the center server 300 through the out-of-vehicle communication unit 205.

Processing Flow

Next, an example of the processing sequence in the in-vehicle system of the present embodiment will be described with reference to FIG. 8. The ECU 100 in FIG. 8 includes the plurality of ECUs (the motor ECU 101, the engine ECU 102, the battery ECU 103, the charging ECU 104, and the like).

Figure 8:
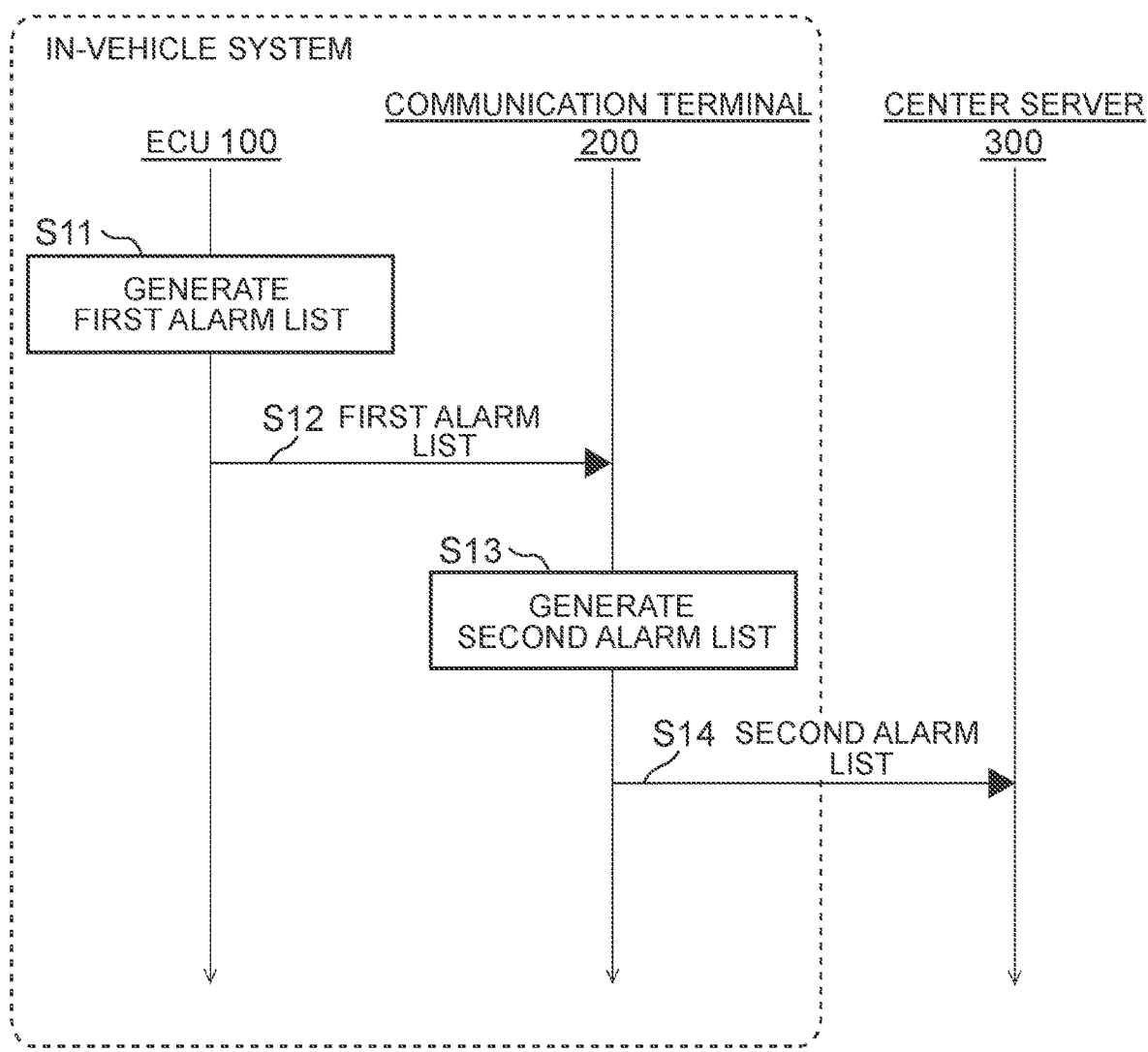
FIG. 8 is a diagram showing an example of a processing sequence in the in-vehicle system.

In FIG. 8, the ECUs 100 mounted on the vehicle 10 each generate the first alarm list at a predetermined cycle (S11). Specifically, the acquisition unit F110 of each ECU 100 acquires the first alarm list in the template state at a predetermined cycle, and the acquired first alarm list is passed to the data generation unit F120. The data generation unit F120 registers the information indicating the presence or absence of an alarm in each item of the first alarm list in the template state so as to complete the first alarm list. Specifically, the data generation unit F120 registers the information indicating the presence or absence of an actual alarm ("1" or "0") for an item under of the control of the ECU 100, among the items included in the first alarm list, as described above. Further, the data generation unit F120 uniformly registers the information indicating the absence of an alarm ("0") for the items that are not under the control of the ECU 100. The first alarm list generated by the data generation unit F120 of each ECU 100 is transmitted to the communication terminal 200 (S12). At that time, in each ECU 100, the transmission unit F130 transmits the first alarm list to the communication terminal 200 through the in-vehicle communication unit 104.

The first alarm lists from the ECUs 100 are received by the in-vehicle communication unit 204 of the communication terminal 200 and passed to the data processing unit F220 through the reception unit F210. The data processing unit F220 generates the second alarm list based on the first alarm lists received from the ECUs 100 (S13). The second alarm list generated by the data processing unit F220 is passed from the data processing unit F220 to the transmission unit F230. The transmission unit F230 transmits the second alarm list to the center server 300 through the out-of-vehicle communication unit 205 (S14).

Figure 9:
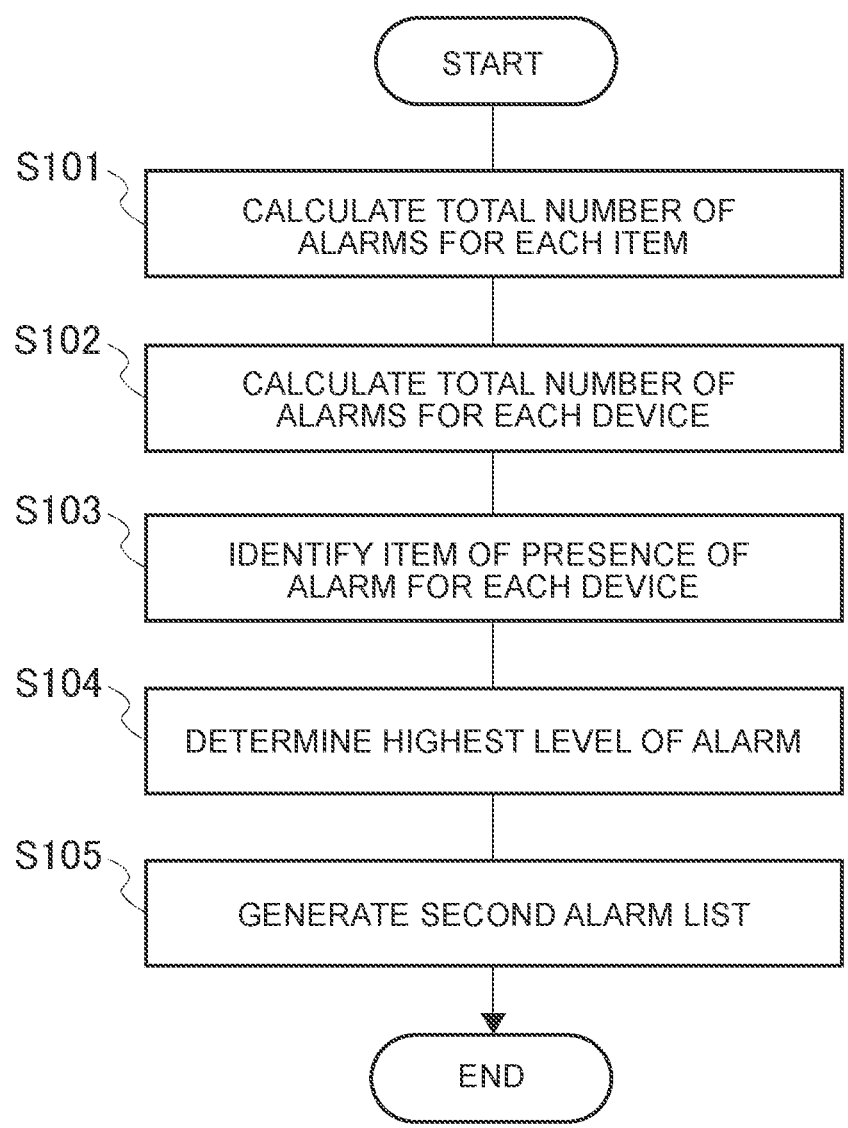
FIG. 9 is a flowchart showing a processing flow executed by the communication terminal when the second alarm list is generated.

Here, a detailed processing flow of the process of S13 will be described with reference to FIG. 9. FIG. 9 is a flowchart showing a processing flow executed by the communication terminal 200 when generating the second alarm list. The processing flow of FIG. 9 is executed, with the reception of the first alarm list from the ECUs 100 by the communication terminal 200 as a trigger.

In the processing flow of FIG. 9, the data processing unit F220 of the communication terminal 200 calculates the total number of alarms registered in the first alarm lists received from the ECUs 100 for each item (step S101). Specifically, the data processing unit F220 performs a logical sum calculation of the numerical values ("0" or "1") registered for each item of the first alarm lists, for each item.

The data processing unit F220 calculates the total number of alarms for each in-vehicle device based on the total number of alarms for each item calculated in step S101 (step S102). Specifically, the data processing unit F220 totals the total number of alarms for each item regarding the battery (the total number of alarms for each item in the items included in E2 in FIG. 7) to calculate the total number of alarms generated in the battery, as described above. The data processing unit F220 totals the total number of alarms for each item regarding the motor (the total number of alarms for each item in the items included in E3 in FIG. 7) to calculate the total number of alarms generated in the motor. The data processing unit F220 totals the total number of alarms for each item regarding the engine (the total number of alarms for each item in the items included in E4 in FIG. 7) to calculate the total number of alarms generated in the engine. The data processing unit F220 totals the total number of alarms for each item regarding the other in-vehicle devices (the total number of alarms for each item in the items included in E5 in FIG. 7) to calculate the total number of alarms generated in the other in-vehicle devices.

The data processing unit F220 identifies an item (alarm item) in which the information indicating the presence of an alarm ("1") is registered in the first alarm lists received from the ECUs 100, for each in-vehicle device (step S103). For example, the data processing unit F220 identifies the item in which the information indicating the presence of an alarm ("1") is registered, among the battery-related items (items included in E2 in FIG. 7) in the first alarm lists received from the ECUs 100. The data processing unit F220 identifies the item in which the information indicating the presence of an alarm ("1") is registered, among the motor-related items (items included in E3 in FIG. 7) in the first alarm lists received from the ECUs 100. The data processing unit F220 identifies the item in which the information indicating the presence of an alarm ("1") is registered, among the engine-related items (items included in E4 in FIG. 7) in the first alarm lists received from the ECUs 100. The data processing unit F220 identifies the item in which the information indicating the presence of an alarm ("1") is registered, among the items related to the other in-vehicle devices (items included in E5 in FIG. 7) in the first alarm lists received from the ECUs 100.

The data processing unit F220 determines the level of the alarm having the highest severity, among the alarms generated in the vehicle 10, based on the total number of alarms for each item calculated in step S102 (step S104). At that time, when the total number of alarms in the item of the "number of alarms of level 3" is "1" or more, the data processing unit F220 determines that the highest level of alarm generated in the vehicle 10 is level 3. When the total number of alarms for each item in the item of the "number of alarms of level 3" is "0" and the total number of alarms for each item in the item of the "number of alarms of level 2" is "1" or more, the data processing unit F220 determines that the highest level of alarm generated in the vehicle 10 is level 2. When the total number of alarms for each item in the item of the "number of alarms of level 3" and the total number of alarms for each item in the item of the "number of alarms of level 2" are "0" and the total number of alarms for each item in the item of the "number of alarms of level 1" is "1" or more, the data processing unit F220 determines that the highest level of alarm generated in the vehicle 10 is level 1. When the total number of alarms for each item in the item of the "number of alarms of level 3", the total number of alarms for each item in the item of the "number of alarms of level 2", and the total number of alarms for each item in the item of the "number of alarms of level 1" are all "0", the data processing unit F220 determines that the highest level of alarm generated in the vehicle 10 is level 0.

The data processing unit F220 generates the second alarm list based on the information derived in step S101 to step S104 (step S105). Specifically, the data processing unit F220 registers the total number of alarms for each item regarding the items of the alarms of the specific types (items included in E1 in FIG. 7), among the total number of alarms for each item that is derived in step S101, in the fifth items in the second alarm list. Also, the data processing unit F220 registers the total number of alarms for each in-vehicle device that is derived in step S102 and the alarm item for each in-vehicle device that is determined in step S103, in the fourth items in the second alarm list. Further, the data processing unit F220 registers the highest level determined in step S104 in the third item in the second alarm list. The second alarm list generated by such a procedure is transmitted to the center server 300 by the transmission unit F230, as described in the description of S14 in FIG. 8.

According to the sequence of FIG. 8 and the processing flow of FIG. 9, the formats of the alarm lists transmitted from the ECUs 100 to the communication terminal 200 can be unified into the first alarm list having a format common to the ECUs 100. Thereby, even when the specifications of the ECUs 100 are changed with changes in the specifications of the in-vehicle devices and the like, a format according to the first alarm list can be used as the format of the alarm lists transmitted from the ECUs 100 to the communication terminal 200. As a result, when the specifications of the in-vehicle devices and the like are changed, the necessity to change the aggregation process performed by the communication terminal 200 does not arise and there is no need to change the design of the communication terminal 200. Moreover, the ECUs 100 transmit information regarding the presence or absence of an alarm to the communication terminal 200 using the first alarm lists having a format common to the ECUs 100, so that various aggregation processes performed by the communication terminal 200 can be simplified. Furthermore, the format of the first alarm lists is set so as to correspond to the format of the second alarm list. Therefore, it is also possible to simplify the process for generating the second alarm list in the communication terminal 200.

Thus, according to the present embodiment, it is possible to provide an in-vehicle system that can flexibly respond to changes in specifications of the in-vehicle devices.

Modifications

A situation is conceivable in which an abnormality occurs in a specific ECU, among the ECUs 100 mounted on the vehicle 10. In such a situation, there is a possibility that the first alarm list is not transmitted from the specific ECU to the communication terminal 200 at a timing corresponding to the predetermined cycle. On the other hand, a situation is conceivable in which an alarm is not generated in the in-vehicle device under the control of the specific ECU. In such a situation, the first alarm list in which the information indicating the absence of an alarm ("0") is registered in the item under the control of the specific ECU is transmitted from the specific ECU to the communication terminal.

In the information processing system according to the above-described embodiment, each of the ECUs 100 uniformly registers the information indicating the absence of an alarm ("0") for the items in the first alarm list that are not under its control. Therefore, in the aggregation results of the total number of alarms for each item, there is a possibility that the communication terminal cannot determine whether an abnormality has occurred in the specific ECU (the first alarm list is not normally transmitted from the specific ECU to the communication terminal 200) or an alarm is not generated in the in-vehicle device under the control of the specific ECU, when the total number of alarms for each item in the items under the control of the specific ECU is "0".

Thus, in this modification, when the first alarm list from the specific ECU, among the ECUs, cannot be received a predetermined number of times consecutively, the communication terminal 200 determines that an abnormality has occurred in the specific ECU.

Figure 10:
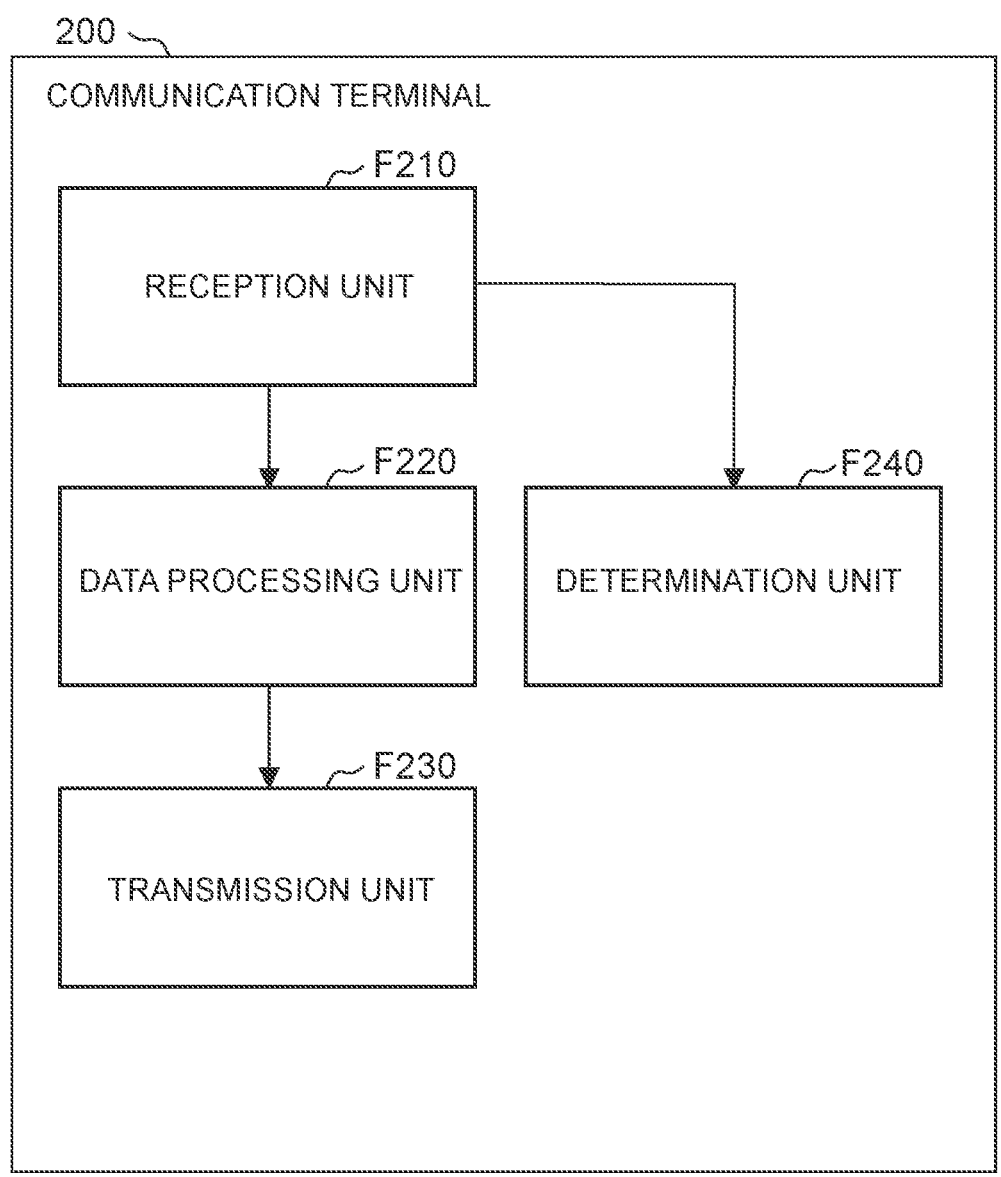
FIG. 10 is a block diagram showing an example of a functional configuration of a communication terminal according to a modification.

FIG. 10 is a block diagram showing an example of a functional configuration of the communication terminal 200 in this modification. The communication terminal 200 in this modification includes the reception unit F210, the data processing unit F220, the transmission unit F230, and a determination unit F240 as its functional components. Since the functions of the data processing unit F220 and the transmission unit F230 are the same as those in the above-described embodiment, the description thereof will be omitted. The reception unit F210 passes the first alarm lists received from the ECUs 100 to the data processing unit F220 and also to the determination unit F240.

Figure 11:
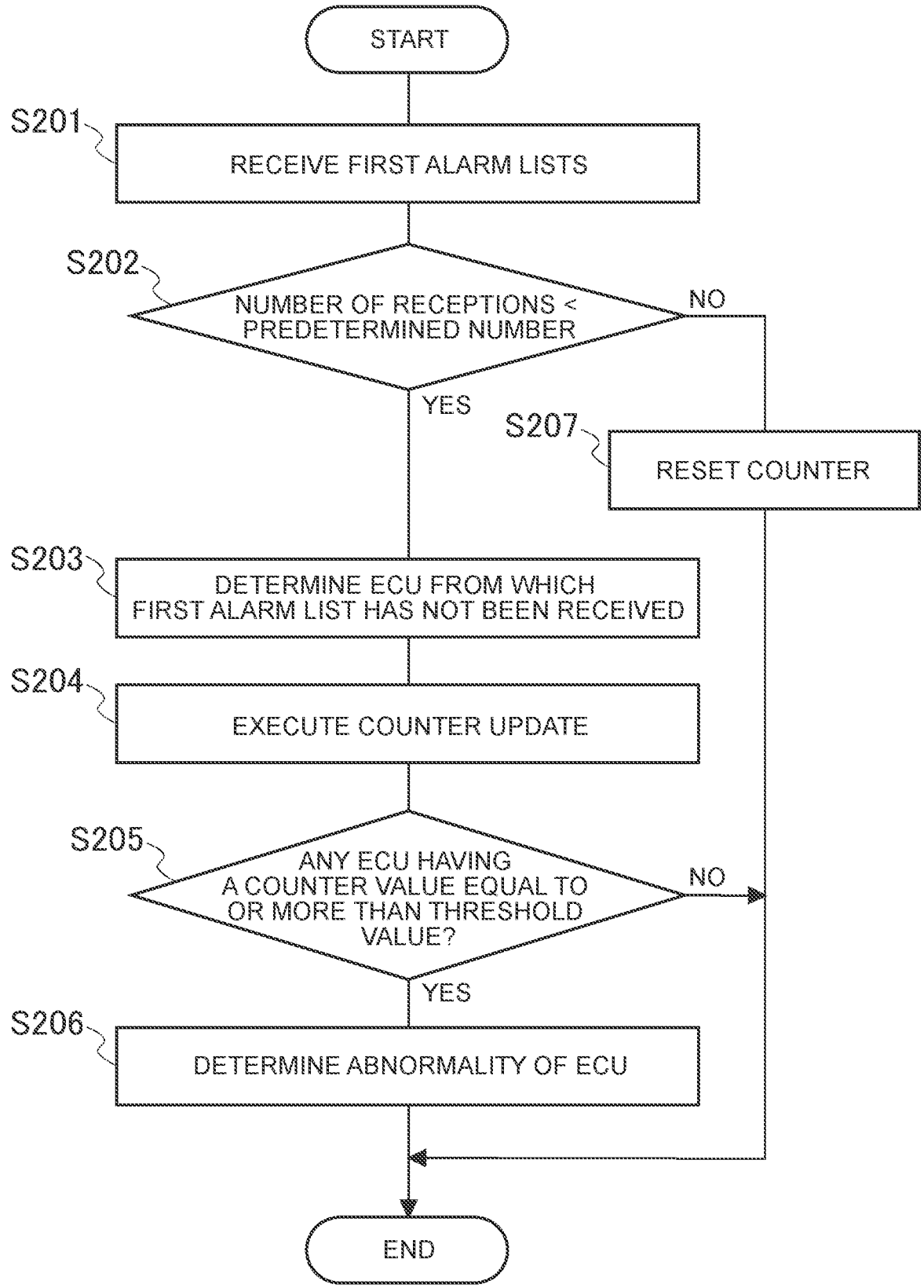
FIG. 11 is a flowchart showing a processing flow executed by the communication terminal in the modification.

The determination unit F240 determines whether an abnormality has occurred in the specific ECU, among the ECUs 100. A processing flow executed by the communication terminal 200 when such a determination is made will be described with reference to FIG. 11. FIG. 11 is a flowchart showing a processing flow executed at a predetermined cycle in the communication terminal 200. The predetermined cycle here is a cycle synchronized with the cycle at which the first alarm lists are transmitted from the ECUs 100 to the communication terminal 200.

In the processing flow of FIG. 11, the reception unit F210 receives the first alarm lists via the in-vehicle communication unit 204 (step S201). The reception unit F210 passes all the received first alarm lists to the determination unit F240.

The determination unit F240 determines whether the number of first alarm lists received by the reception unit F210 is less than a predetermined number (step S202). The "predetermined number" here is the same value as the number of ECUs 100 mounted on the vehicle 10. When the number of first alarm lists received by the reception unit F210 is equal to or more than the predetermined number (negative determination in step S202), the determination unit F240 resets the counter (step S207). The "counter" here is a counter for counting the number of times that the first alarm list cannot be received in the case where the first alarm lists cannot be received consecutively, and the counter is set for each ECU. Such a counter is incremented by one when the first alarm list from the corresponding ECU cannot be received, and is reset to "0" when the first alarm list from the corresponding ECU can be received. When the reset of the counter described above is completed in step S207, the present processing flow is ended.

When the number of first alarm lists received by the reception unit F210 is less than the predetermined number (affirmative determination in step S202), the process of step S203 is executed. In step S203, the determination unit F240 determines the ECU from which the first alarm list could not be received (unreceived ECU). At that time, each ECU 100 may be set so as to transmit its own identification information to the communication terminal 200 together with the first alarm list, and the determination unit F240 may identify the ECU 100 from which the identification information could not be received. Alternatively, the ECUs 100 mounted on the vehicle 10 may be set so as to transmit the first alarm lists at different timings, and the determination unit F240 may identify the ECU 100 from which the first alarm list could not be received at the set timing. When the ECU 100 from which the first alarm list could not be received is determined in these ways, the process of step S204 is executed.

In step S204, the determination unit F240 updates the counters. Specifically, the counter corresponding to the ECU 100 determined in step S203 is incremented by one, and the counters corresponding to the other ECUs 100 are reset to "0". When the update of the counters is completed, the process of step S205 is executed.

In step S205, the determination unit F240 determines whether there is an ECU 100 having a counter value equal to or more than a threshold value. The "threshold value" here is a threshold value for determining whether an abnormality has occurred in the ECU 100, and is set to an integer of 2 or more. When there is no ECU 100 having a counter value equal to or more than the threshold value (negative determination in step S205), this processing flow is terminated. On the other hand, when there is an ECU 100 having a counter value equal to or more than the threshold value (affirmative determination in step S205), the determination unit F240 determines that an abnormality has occurred in the ECU 100 (step S206). After the process of step S206 is executed, the execution of this processing flow is ended.

According to the processing flow of FIG. 11, when the total number of alarms for each item in the items under the control of the specific ECU is "0", it is possible to determine whether an abnormality has occurred in the specific ECU or an alarm is not generated in the in-vehicle device under the control of the specific ECU. As a result, the communication terminal 200 can also generate more accurate second alarm list.

Others

The above-described embodiment and modification are merely examples, and the present disclosure may be appropriately modified to be implemented without departing from the scope thereof. Also, the processes and the configurations described in the present disclosure can be appropriately combined to be implemented as long as no technical contradiction occurs. Moreover, the processes described as being executed by one device may be shared and executed by a plurality of devices. Alternatively, the processes described as being executed by different devices may be executed by one device. In the computer system, it is possible to flexibly change the hardware configuration for implementing each function.

The present disclosure can also be implemented by supplying a computer with a computer program that implements the functions described in the above embodiment and modification and causing one or more processors of the computer to read and execute the program. Such a computer program may be provided to the computer by a non-transitory computer-readable storage medium connectable to the system bus of the computer, or may be provided to the computer via a network. A non-transitory computer-readable storage medium is a recording medium that can store information such as data and programs by electrical, magnetic, optical, mechanical, or chemical action and can be read from a computer or the like. Such a non-transitory computer-readable storage medium is a disc of any type such as a magnetic disc (floppy (registered trademark) disc, HDD, and the like) or an optical disc (CD-ROM, DVD, Blu-ray disc, and the like). Further, the non-transitory computer-readable storage medium may be a medium such as a read-only memory (ROM), a random access memory (RAM), an EPROM, an EEPROM, a magnetic card, a flash memory, an optical card, or a solid state drive (SSD).

What is claimed is:

1. An information processing system comprising:
a plurality of electronic control units (ECUs) mounted on a vehicle; and
a communication terminal mounted on the vehicle, wherein:
each of the plurality of ECUs executes
acquiring a first alarm list in a template state, the first alarm list having a format common to the plurality of ECUs and including a plurality of items for registering presence or absence of an alarm regarding devices mounted on the vehicle by type of alarm,
registering information indicating presence or absence of an actual alarm, for an item under control of an ECU, among the plurality of items in the acquired first alarm list,
uniformly registering information indicating absence of an alarm, for an item that is not under the control of the ECU, among the plurality of items in the acquired first alarm list, and
transmitting the first alarm list in which registration of the information indicating the presence or absence of an alarm is completed, to the communication terminal; and the communication terminal executes
aggregating the number of alarms registered in a plurality of the first alarm lists received from the plurality of ECUs, for each of the items included in the first alarm list, and
aggregating the number of alarms registered in the plurality of the first alarm lists for each of the devices.

2. The information processing system according to claim 1, wherein the communication terminal further executes
generating a second alarm list including an item in which an aggregation result of the number of alarms for each of the items is registered and an item in which an aggregation result of the number of alarms for each of the devices is registered, and
transmitting the generated second alarm list to a predetermined server.

3. The information processing system according to claim 2, wherein the plurality of items in the first alarm list includes
a plurality of first items for registering the presence or absence of an alarm regarding the devices by type of alarm, and
a plurality of second items for registering a total number of alarms generated under the control of each of the plurality of ECUs for each of levels corresponding to severity of alarm.

4. The information processing system according to claim 3, wherein:
the devices include a rechargeable battery and a motor that uses electric power of the battery to cause the vehicle to travel; and
the plurality of first items includes an item for registering presence or absence of an alarm regarding the battery by type of alarm and an item for registering presence or absence of an alarm regarding the motor by type of alarm.

5. The information processing system according to claim 3, wherein:
the second alarm list includes
a third item for registering information indicating a level of an alarm having the highest severity among the alarms generated in the vehicle,
a fourth item for registering the aggregation result of the number of alarms for each of the devices, and
a fifth item for registering presence or absence of an alarm of a specific type regarding the devices; and
the plurality of first items in the first alarm list includes an item for registering presence or absence of an alarm of the same type as that of the fifth item.

6. The information processing system according to claim 5, wherein the communication terminal executes
identifying the alarm having the highest severity, among the alarms generated in the vehicle, based on the information registered in the second item in the plurality of the first alarm lists received from the plurality of ECUs, and registering the information indicating the level of the identified alarm in the third item in the second alarm list,
aggregating the number of alarms registered in the plurality of first items in the plurality of the first alarm lists for each of the devices, and registering the aggregation result in the fourth item in the second alarm list, and
aggregating the number of alarms registered in an item corresponding to the fifth item in the second alarm list, among the plurality of first items in the plurality of the first alarm lists, and registering the aggregation result in the fifth item in the second alarm list.

7. The information processing system according to claim 1, wherein:
the plurality of ECUs repeatedly executes transmitting the first alarm list to the communication terminal at a predetermined cycle; and
when the communication terminal has not received the first alarm list from a specific ECU, among the plurality of ECUs, a predetermined number of times consecutively, the communication terminal executes determining that an abnormality has occurred in the specific ECU.

8. A communication terminal mounted on a vehicle including a plurality of electronic control units (ECUs), the communication terminal comprising a control unit that executes
receiving a first alarm list from each of the plurality of ECUs, the first alarm list having a format common to the plurality of ECUs and including a plurality of items for registering presence or absence of an alarm regarding devices mounted on the vehicle by type of alarm, and the first alarm list being a list in which information indicating presence or absence of an actual alarm is registered for an item under control of each of the plurality of ECUs, among the plurality of items, and information indicating absence of an alarm is uniformly registered for an item that is not under the control of each of the plurality of ECUs, among the plurality of items,
aggregating the number of alarms registered in a plurality of the first alarm lists received from the plurality of ECUs, for each of the items included in the first alarm list, and
aggregating the number of alarms registered in the plurality of the first alarm lists for each of the devices.

9. The communication terminal according to claim 8, wherein the control unit further executes
generating a second alarm list including an item in which an aggregation result of the number of alarms for each of the items is registered and an item in which an aggregation result of the number of alarms for each of the devices is registered, and
transmitting the generated second alarm list to a predetermined server.

10. The communication terminal according to claim 9, wherein the plurality of items in the first alarm list includes
a plurality of first items for registering the presence or absence of an alarm regarding the devices by type of alarm, and
a plurality of second items for registering a total number of alarms generated under the control of each of the plurality of ECUs for each of levels corresponding to severity of alarm.

11. The communication terminal according to claim 10, wherein:
the devices include a rechargeable battery and a motor that uses electric power of the battery to cause the vehicle to travel; and
the plurality of first items includes an item for registering presence or absence of an alarm regarding the battery by type of alarm and an item for registering presence or absence of an alarm regarding the motor by type of alarm.

12. The communication terminal according to claim 10, wherein:
the second alarm list includes
a third item for registering information indicating a level of an alarm having the highest severity among the alarms generated in the vehicle,
a fourth item for registering the aggregation result of the number of alarms for each of the devices, and
a fifth item for registering presence or absence of an alarm of a specific type regarding the devices; and
the plurality of first items in the first alarm list includes an item for registering presence or absence of an alarm of the same type as that of the fifth item.

13. The communication terminal according to claim 12, wherein the control unit executes
identifying the alarm having the highest severity, among the alarms generated in the vehicle, based on the information registered in the second item in the plurality of first alarm lists received from the plurality of ECUs, and registering the information indicating the level of the identified alarm in the third item in the second alarm list,
aggregating the number of alarms registered in the plurality of first items in the plurality of the first alarm lists for each of the devices, and registering the aggregation result in the fourth item in the second alarm list, and
aggregating the number of alarms registered in an item corresponding to the fifth item in the second alarm list, among the plurality of first items in the plurality of the first alarm lists, and registering the aggregation result in the fifth item in the second alarm list.

14. The communication terminal according to claim 8, wherein:
the first alarm list is repeatedly transmitted from the plurality of ECUs to the communication terminal at a predetermined cycle; and
when the control unit has not received the first alarm list from a specific ECU, among the plurality of ECUs, a predetermined number of times consecutively, the control unit determines that an abnormality has occurred in the specific ECU.

15. An information processing method, wherein a communication terminal mounted on a vehicle including a plurality of electronic control units (ECUs) executes
a step of receiving a first alarm list from each of the plurality of ECUs, the first alarm list having a format common to the plurality of ECUs and including a plurality of items for registering presence or absence of an alarm regarding devices mounted on the vehicle by type of alarm, and the first alarm list being a list in which information indicating presence or absence of an actual alarm is registered for an item under control of each of the plurality of ECUs, among the plurality of items, and information indicating absence of an alarm is uniformly registered for an item that is not under the control of each of the plurality of ECUs, among the plurality of items,
a step of aggregating the number of alarms registered in a plurality of the first alarm lists received from the plurality of ECUs, for each of the items included in the first alarm list, and
a step of aggregating the number of alarms registered in the plurality of the first alarm lists for each of the devices.

16. The information processing method according to claim 15, wherein the communication terminal further executes
a step of generating a second alarm list including an item in which an aggregation result of the number of alarms for each of the items is registered and an item in which an aggregation result of the number of alarms for each of the devices is registered, and
a step of transmitting the generated second alarm list to a predetermined server.

17. The information processing method according to claim 16, wherein the plurality of items in the first alarm list includes
a plurality of first items for registering the presence or absence of an alarm regarding the devices by type of alarm, and
a plurality of second items for registering a total number of alarms generated under the control of each of the plurality of ECUs for each of levels corresponding to severity of alarm.

18. The information processing method according to claim 17, wherein:
the second alarm list includes
a third item for registering information indicating a level of an alarm having the highest severity among the alarms generated in the vehicle,
a fourth item for registering the aggregation result of the number of alarms for each of the devices, and
a fifth item for registering presence or absence of an alarm of a specific type regarding the devices; and
the plurality of first items in the first alarm list includes an item for registering presence or absence of an alarm of the same type as that of the fifth item.

19. The information processing method according to claim 18, wherein the step of generating the second alarm list includes
a step of identifying the alarm having the highest severity, among the alarms generated in the vehicle, based on the information registered in the second item in the plurality of first alarm lists received from the plurality of ECUs, and registering the information indicating the level of the identified alarm in the third item in the second alarm list,
a step of aggregating the number of alarms registered in the plurality of first items in the plurality of the first alarm lists for each of the devices, and registering the aggregation result in the fourth item in the second alarm list, and
a step of aggregating the number of alarms registered in an item corresponding to the fifth item in the second alarm list, among the plurality of first items in the plurality of the first alarm lists, and registering the aggregation result in the fifth item in the second alarm list.

20. The information processing method according to claim 15, wherein:
the first alarm list is repeatedly transmitted from the plurality of ECUs to the communication terminal at a predetermined cycle; and
when the communication terminal has not received the first alarm list from a specific ECU, among the plurality of ECUs, a predetermined number of times consecutively, the communication terminal further executes a step of determining that an abnormality has occurred in the specific ECU.

* * * * *